United States Patent
Köpfer

(10) Patent No.: US 10,609,193 B2
(45) Date of Patent: Mar. 31, 2020

(54) SIM CARD RELEASE MECHANISM WITH SMA ACTUATOR

(71) Applicant: ACTUATOR SOLUTIONS GMBH, Gunzenhausen (DE)

(72) Inventor: Markus Köpfer, Stoedtlen-Regelsweiler (DE)

(73) Assignee: ACTUATOR SOLUTIONS GMBH, Gunzenhausen (DE)

( * ) Notice: Subject to any disclaimer, the term of this patent is extended or adjusted under 35 U.S.C. 154(b) by 0 days.

(21) Appl. No.: 16/347,055

(22) PCT Filed: Dec. 6, 2018

(86) PCT No.: PCT/IB2018/059707
§ 371 (c)(1),
(2) Date: May 2, 2019

(87) PCT Pub. No.: WO2019/145768
PCT Pub. Date: Aug. 1, 2019

(65) Prior Publication Data
US 2019/0379774 A1 Dec. 12, 2019

(30) Foreign Application Priority Data
Jan. 25, 2018 (IT) .................. 102018000001887

(51) Int. Cl.
*H04M 1/02* (2006.01)
*H01R 13/635* (2006.01)
(Continued)

(52) U.S. Cl.
CPC ........ *H04M 1/0274* (2013.01); *H01R 12/712* (2013.01); *H01R 13/6272* (2013.01); *H01R 13/6278* (2013.01); *H01R 13/635* (2013.01)

(58) Field of Classification Search
CPC .... H04M 1/0274; H04M 1/0249; H04M 1/18; H04M 2201/36; H01R 13/6272;
(Continued)

(56) References Cited

U.S. PATENT DOCUMENTS

2015/0018041 A1* 1/2015 Gorilovsky ........... G06F 1/1626
455/558
2018/0109032 A1* 4/2018 Chen .................... G06K 7/0021

FOREIGN PATENT DOCUMENTS

| WO | WO 96/18224 A1 | 6/1996 | |
|---|---|---|---|
| WO | WO-9618224 A1 * | 6/1996 | ............. G06K 13/08 |
| WO | WO 2013/144291 A1 | 10/2013 | |

OTHER PUBLICATIONS

International Search Report for PCT/IB2018/059707 (PCT/ISA/210) dated Apr. 4, 2019.
(Continued)

*Primary Examiner* — Zhitong Chen
(74) *Attorney, Agent, or Firm* — Birch, Stewart, Kolasch & Birch, LLP

(57) ABSTRACT

A mechanism for releasing a SIM card locked into an electronic device by a spring-loaded mechanical restraint (4, 5) includes a SIM card holder comprising a rectangular frame (1), a SMA wire actuator (10) mounted on said frame (1) so as to deform it upon activation in order to release said mechanical restraint (4, 5), and springs (8) for the ejection of the SIM card holder upon release of the mechanical restraint.

25 Claims, 3 Drawing Sheets

(51) Int. Cl.
*H01R 13/627* (2006.01)
*H01R 12/71* (2011.01)

(58) Field of Classification Search
CPC .............. H01R 13/6278; H01R 13/635; H01R 12/712; H01R 12/005
See application file for complete search history.

(56) References Cited

OTHER PUBLICATIONS

Written Opinion of the International Searching Authority for PCT/IB2018/059707 (PCT/ISA/237) dated Apr. 4, 2019.

* cited by examiner

SIM CARD RELEASE MECHANISM WITH SMA ACTUATOR

BACKGROUND OF THE INVENTION

Field of the Invention

The present invention relates to a mechanism for releasing a SIM card locked into an electronic device, typically a cellular phone or the like, said mechanism incorporating at least one shape memory alloy (SMA) wire as actuating element. Reference will be made in the following specifically to a SIM card, although it is clear that what is being said can obviously be applied to other types of cards such as SD memory cards and the like.

It is known that the SIM card is typically held in a SIM card holder that is a small rectangular frame with a space for receiving the SIM card and a cover on one side that closes an access opening in the device case when the holder occupies its seat. The holder is locked into the device by a spring-loaded mechanical restraint that keeps the holder cover flush with the device case surface, so that the SIM card is inaccessible and the holder cannot be pulled out of its seat. In order to release the card holder and have it project outside of the device so that it can be extracted, a small hole is provided next to the holder seat for the introduction of an eject tool in the form of a specific pin or the tip of a small paper clip, so as to mechanically disengage the restraint and allow a spring to push out the holder.

This simple arrangement has various drawbacks in that the presence of the hole allows for the penetration of moisture, water and dust that can be quite detrimental to the operation of the restraint release mechanism and/or of the device as a whole. Furthermore, releasing the holder may require a significant amount of force which also can result in damage to the restraint release mechanism and/or the device, and the holder may remain locked into its seat if the eject tool is broken into the hole thus requiring a partial dismantling of the device to access the holder.

Another negative aspect of this solution is that it does not provide any defense against theft since anyone can release the holder with a suitable tool. This means that if the device is stolen it may be used by an illegitimate user simply by changing the SIM card, because the original SIM card that may contain information which prevents another user from using the device illegitimately is easily replaced.

Moreover, the SIM card itself may be stolen such that the thief may pose as the legitimate owner of the device in order to receive sensitive information intended for the owner, e.g. a one-time password to access a bank account and/or to send a payment. This is clearly undesirable, therefore there is a need to have a way of preventing the removal of the SIM card from the device without the latter being powered on and being first subject to an unlock code entry process, which could help to ensure that only a legitimate user of the device can access the SIM card of the device.

Description of Related Art

U.S. Pat. No. 8,553,419 discloses a SIM card holder ejection mechanism that overcomes these drawbacks by using two electromagnetic motors to release the lock and eject the holder, thus resulting quite bulky and expensive.

US 2015/0018041 discloses a SIM card holder ejection mechanism in which a hook locking the holder is retracted by a SMA wire, thus resulting in a smaller and cheaper mechanism. Generally speaking the use of SMA wires as actuating elements provides various advantages with respect to other actuating systems in terms of weight, size, power consumption and cost therefore such an arrangement is a clear improvement over U.S. Pat. No. 8,553,419, yet it is not free from drawbacks.

In fact, the SMA wire used as actuator extends along the three internal sides of the holder seat in order to be sufficiently long to effectively retract the hook. This means that the SMA wire must turn around two corners passing in grooves formed in rounded corner members which make the mechanism rather bulky and, despite their rounded shape, also constitute stress points for the wire thus negatively affecting the reliability of the mechanism.

Another drawback resides in the fact that the SMA wire is mounted inside the device and is powered through two contacts soldered to a pad on a printed circuit board (PCB) of the device. This means that the PCB is more complicated and expensive to manufacture and that the SMA wire takes a rather long time to cool down after being powered off since it is located in a very small space inside the device. Moreover, the SMA wire can be subject to overheating if its operation starts at a rather high temperature due to the device being held in a hot environment, such that the preset activation time of the SMA wire results in an excessive final temperature thereof.

WO 96/18224 discloses a similar but even more complicated memory card holder ejection mechanism, in which a pin locking the holder is retracted by a SMA wire such that a pivotable arm can move to engage a spring-loaded ejection plate.

BRIEF SUMMARY OF THE INVENTION

The object of the present invention is therefore to provide a SIM card release mechanism with a SMA actuator that overcomes the drawbacks still present in the known art. This object is achieved through a mechanism having the features recited in claim 1, while other advantageous additional features are recited in the dependent claims.

The main advantage of the present mechanism resides in combining the convenient features of prior art mechanisms while avoiding their drawbacks, since:

- it uses a shorter and straight SMA wire as actuator, which results in a higher reliability and a smaller size of the mechanism since the rounded corner members utilized in US 2015/0018041 are dispensed with;
- the SMA wire takes just a short time to cool down after being powered off since it is mounted on the holder and therefore is taken out of the device together with the holder;
- it has a simple electrical connection to the SMA wire through a low-cost FET and two conductive pads located adjacent to the access opening to the holder seat, said pads making contact, when the holder is locked in place, with two conductive strips mounted on the holder and connected to the ends of the SMA wire;
- it prevents the risk of overheating regardless of the environmental temperature thanks to the absence of a preset activation time of the SMA wire, since the power to the SMA wire is immediately cut off when the holder is released and pushed out by the ejection spring in that the conductive pads and the conductive strips are disconnected as soon as the card holder is moved with respect to the device case.

BRIEF DESCRIPTION OF THE DRAWINGS

These and other advantages and characteristics of the mechanism according to the present invention will be clear to those skilled in the art from the following detailed description of an embodiment thereof, with reference to the annexed drawings wherein.

DETAILED DESCRIPTION OF THE INVENTION

Figure 1:
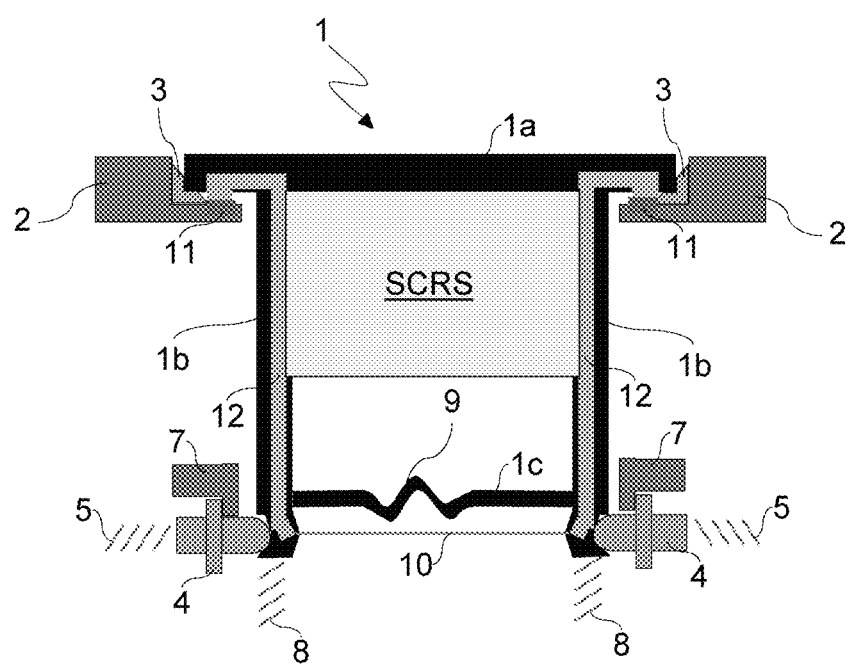
FIG. 1 is a schematic front view of a mechanism according to the present invention with the holder in the locked condition and holding a SIM card.

In the above figures the dimensions and dimensional ratios of the elements may not be correct and in some cases, such as for example with regards to the SMA wire diameter, have been altered in order to enhance the drawing comprehension.

These figures show a mechanism according to the present invention that conventionally includes, as previously mentioned, a SIM card holder comprising a substantially rectangular frame 1 made up of an external cover 1a that closes an access opening formed in a device case 2, two legs 1b extending orthogonally from said cover 1a into said device case 2 and an internal side 1c orthogonally connecting said two legs 1b, said holder defining a SIM card receiving space SCRS located adjacent to cover 1a and in which a SIM card is fitted.

It is to be underlined that the terms orthogonal/orthogonally are to be interpreted in a "real word" context, i.e. in the mechanisms according to the present invention small departures from the ideal orthogonal condition are possible, more specifically the acceptable tolerance is typically within ±5°, i.e. the formed angles are comprised between 85° and 95°.

A gasket 3 is provided close to said access opening such that, in cooperation with the external cover 1a, passage of any undesired substance (water, dust, etc.) through the access opening is prevented.

The holder is locked into the device by a spring-loaded mechanical restraint that keeps the holder cover 1a flush with the external surface of the device case 2. More specifically, in the illustrated embodiment such a restraint consists of a pair of opposite locking pins 4 with rounded tips that are pushed by relevant springs 5 into engagement with the end portions of legs 1b, preferably orthogonally thereto, where correspondingly shaped seats 6 are formed. The engagement position of said locking pins 4 is defined by end stops 7, formed on the device case, on which pins 4 go into abutment such that springs 5 cannot push them further towards the holder frame 1.

Ejection of the holder upon release of the mechanical restraint is provided by elastic means preferably consisting of a pair of ejection springs 8 aligned with legs 1b, so as to achieve a balanced push, although they could be arranged differently and/or a single spring 8 could be used, preferably at a central position. By the same token, also pins 4 and springs 5 could be arranged differently and/or a single pin+spring assembly could be used.

The release of the mechanical restraint is achieved through activation of a SMA actuating element preferably in the form of a SMA wire 10, although other forms of SMA actuator are possible such as strips or the like.

The above-described conventional structure is further provided with the following novel and inventive features that characterize the present invention:

the SIM card receiving space SCRS is extended along legs 1b, i.e. in the length direction, so as to take up only a fraction of their length, preferably about one half of their length, whereas in an alternative embodiment (not shown in the drawings) it is extended along substantially the whole length of legs 1b but on a different plane with respect thereto in a direction perpendicular to the plane of frame 1, i.e. in the thickness direction;

the internal side 1c of the holder frame 1 has at least one spring-like flexible portion 9 that allows a longitudinal contraction of said side 1c, i.e. the two legs 1b can be moved closer to each other with respect to the locked condition illustrated in FIG. 1;

the SMA wire 10 extends between the two legs 1b, preferably orthogonally thereto and in correspondence with the end seats 6;

two conductive pads 11 are arranged adjacent to the access opening of the device case 2, internally with respect to gasket 3;

two conductive strips 12 are arranged on the holder frame 1 along the two legs 1b respectively, said strips 12 extending between the ends of said SMA wire 10 and the end portions of the external cover 1a at a position in correspondence with said conductive pads 11.

To protect the SMA wire 10 from damage, it can be connected and sealed to the SIM card holder by a flexible glue which allows a 2% contraction.

The simple and effective operation of the mechanism according to the present invention will be readily understood from the description given above.

Starting from the locked condition of FIG. 1, and with the device powered on and in unlocked status, in order to release the SIM card the user opens an application running on the device (or accedes to a setup menu or the like, as explained in detail in US 2015/0018041) and issues a specific command. This command will trigger a short energy pulse to feed current to the conductive pads 11 that are in contact with the conductive strips 12 which lead the current to the SMA wire 10.

Figure 2:
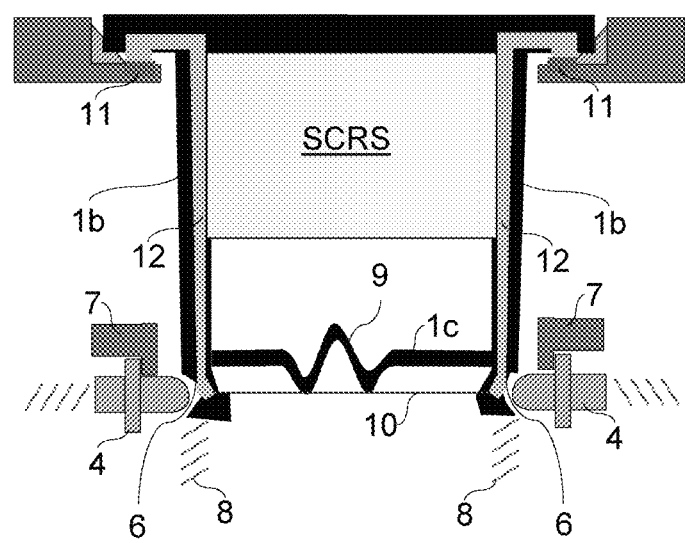
FIG. 2 is a view similar to FIG. 1 of the mechanism being activated to release the holder.

As shown in FIG. 2, the passage of current through the SMA wire 10 causes it to heat and contract upon reaching its transition temperature. This contraction of wire 10 results in a contraction also of the internal side 1c at its flexible portion 9, whereby legs 1b are pulled inwards closer to each other at their internal half extending beyond the SIM card receiving space SCRS. As a consequence, their end seats 6 are disengaged from the locking pins 4, that remain in abutment against stops 7.

It is worth noting that in the present invention the SMA wire therefore does not act on the hooking members, i.e. the locking pins 4, but rather on the holder elements that they engage, i.e. seats 6, whereby the mechanism operates in a way that is the opposite of the mechanism taught in US 2015/0018041.

Figure 3:
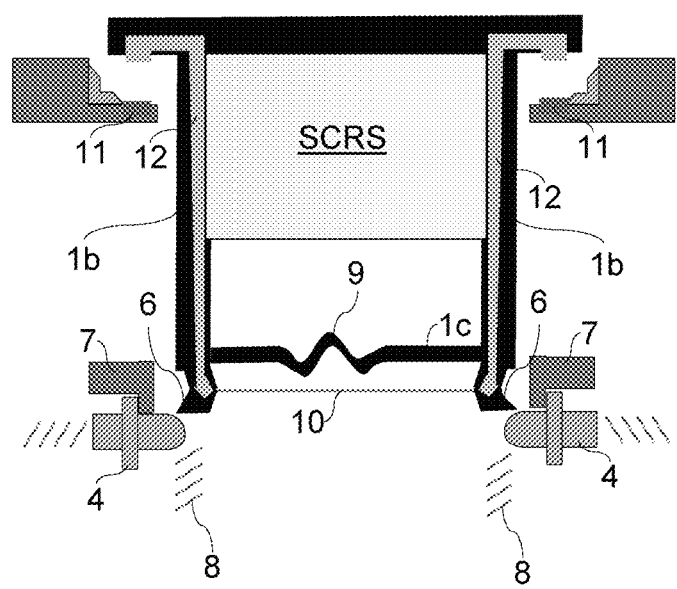
FIG. 3 is a view similar to FIG. 1 of the mechanism with the holder in the released condition.

In this condition, the ejection springs 8 can push the holder outside of the device case 2 thus achieving the release of the SIM card, as illustrated in FIG. 3 where the SMA wire 10 has already cooled down and the holder frame 1 has resumed its undeformed rest shape. It should also be noted that as soon as springs 8 start to push out the holder, the contact between pads 11 and strips 12 is interrupted since the SMA wire 10 has already performed the required contraction, thus effectively preventing the risk of overheating of the wire.

The SIM card holder can be returned to the locked condition of FIG. 1 simply by pushing it manually back into its seat within the device case 2, such that the ends of legs 1b push aside the rounded locking pins 4 overcoming the resistance of springs 5 until pins 4 spring back into engagement with seats 6. It is obvious that the ends of legs 1b, the tips of pins 4 and seats 6 are shaped to facilitate this operation as well as the releasing operation, therefore other shapes different from those illustrated in the drawings can be adopted (e.g. pins 4 with a triangular tip, seats 6 with a triangular recess and legs 1b with a beveled end matching the inclination of the tip of pins 4, so as to obtain two contact planes sliding on each other).

The above-mentioned alternative embodiment obviously operates in the same way, the only difference being that the holder will be shorter and thicker since the SIM card receiving space SCRS is extended along substantially the whole length of legs 1b but on a different plane in the thickness direction, such that a SIM card fitted therein will not prevent the contraction of the internal side 1c. This allows the designer to choose a longer and thinner holder or a shorter and thicker one according to the geometrical constraints within the device case.

The mechanism according to the present invention is not restricted to a specific type of SMA wire, but any SMA wire activated by Joule effect may be usefully employed. Having said that, preferred is the use of a SMA wire made with Ni—Ti alloys widely known in the field with the name of Nitinol, with diameters ranging from 20 µm to 150 µm and commercially available from a variety of sources, for examples the wires sold under the trade name Smartflex by SAES Getters S.p.A., of particular preference is the use of 50 µm wires.

The invention claimed is:

1. A mechanism for releasing a SIM card locked into an electronic device, said mechanism including:
   a SIM card holder comprising a substantially rectangular frame (1) made up of an external cover (1a) that closes an access opening formed in a device case (2), two legs (1b) extending orthogonally from said external cover (1a) into said device case (2) and an internal side (1c) orthogonally connecting said two legs (1b), said holder defining a SIM card receiving space, SCRS, located adjacent to the external cover (1a);
   a mechanical restraint that keeps the SIM card holder locked inside the device such that the external cover (1a) is flush with the external surface of the device case (2);
   a shape memory alloy actuating element, that upon activation releases said mechanical restraint;
   elastic means for the ejection of the SIM card holder upon release of the mechanical restraint;
   wherein
   said mechanical restraint is spring-loaded;
   said internal side (1c) of the holder frame (1) has at least one spring-like flexible portion (9) that allows a longitudinal contraction of said internal side (1c);
   the shape memory alloy actuating element extends between the two legs (1b) of the holder frame (1);
   the SIM card receiving space, SCRS, is extended along the two legs (1b), either in the length direction or in the thickness direction, such that a SIM card fitted therein does not prevent said longitudinal contraction of the internal side (1c);
   and in that said mechanism further includes
   two conductive pads (11) arranged adjacent to the access opening of the device case (2); and
   two conductive strips (12) arranged on the holder frame (1) along the two legs (1b) respectively, said conductive strips (12) extending between the ends of the shape memory alloy actuating element and the end portions of the external cover (1a) at a position in correspondence with said conductive pads (11).

2. The mechanism according to claim 1, wherein the SIM card receiving space, SCRS, is extended along the two legs (1b) in the length direction so as to take up only a fraction of their length.

3. The mechanism according to claim 2, wherein the spring-loaded mechanical restraint consists of a pair of opposite locking pins (4) that are pushed by relevant springs (5) into engagement with the end portions of the legs (1b), where correspondingly shaped seats (6) are formed, the engagement position of said locking pins (4) being defined by end stops (7) formed on the device case (2).

4. The mechanism according to claim 3, wherein the engagement with the end portions of the legs (1b) is orthogonally thereto.

5. The mechanism according to claim 2, wherein the elastic means for the ejection of the SIM card holder consist of a pair of ejection springs (8) aligned with the legs (1b).

6. The mechanism according to claim 2, wherein the shape memory alloy actuating element is connected and sealed to the SIM card holder by a flexible glue which allows a 2% contraction.

7. The mechanism according to claim 2, wherein a gasket (3) is provided close to the ends of said access opening and externally with respect to the conductive pads (11), said gasket (3) being suitable to prevent, in cooperation with the external cover (1a), the passage of any undesired substance through the access opening.

8. The mechanism according to claim 2, wherein the fraction is about a half of their length.

9. The mechanism according to claim 1, wherein the SIM card receiving space, SCRS, is extended along substantially the whole length of the two legs (1b) but on a different plane in the thickness direction.

10. The mechanism according to claim 3, wherein the spring-loaded mechanical restraint consists of a pair of opposite locking pins (4) that are pushed by relevant springs (5) into engagement with the end portions of the legs (1b), where correspondingly shaped seats (6) are formed, the engagement position of said locking pins (4) being defined by end stops (7) formed on the device case (2).

11. The mechanism according to claim 10, wherein the engagement with the end portions of the legs (1b) is orthogonally thereto.

12. The mechanism according to claim 9, wherein the elastic means for the ejection of the SIM card holder consist of a pair of ejection springs (8) aligned with the legs (1b).

13. The mechanism according to claim 9, wherein the shape memory alloy actuating element is connected and sealed to the SIM card holder by a flexible glue which allows a 2% contraction.

14. The mechanism according to claim 1, wherein the spring-loaded mechanical restraint consists of a pair of opposite locking pins (4) that are pushed by relevant springs (5) into engagement with the end portions of the legs (1b), where correspondingly shaped seats (6) are formed, the engagement position of said locking pins (4) being defined by end stops (7) formed on the device case (2).

15. The mechanism according to claim 4, wherein the shape memory alloy actuating element is located in correspondence with the seats (6) formed in the end portions of the legs (1b).

16. The mechanism according to claim 15, wherein the elastic means for the ejection of the SIM card holder consist of a pair of ejection springs (8) aligned with the legs (1b).

17. The mechanism according to claim 15, wherein the shape memory alloy actuating element is connected and sealed to the SIM card holder by a flexible glue which allows a 2% contraction.

18. The mechanism according to claim 14, wherein the elastic means for the ejection of the SIM card holder consist of a pair of ejection springs (8) aligned with the legs (1b).

19. The mechanism according to claim 14, wherein the shape memory alloy actuating element is connected and sealed to the SIM card holder by a flexible glue which allows a 2% contraction.

20. The mechanism according to claim 14, wherein the engagement with the end portions of the legs (1b) is orthogonally thereto.

21. The mechanism according to claim 1, wherein the elastic means for the ejection of the SIM card holder consist of a pair of ejection springs (8) aligned with the legs (1b).

22. The mechanism according to claim 21, wherein the shape memory alloy actuating element is connected and sealed to the SIM card holder by a flexible glue which allows a 2% contraction.

23. The mechanism according to claim 1, wherein the shape memory alloy actuating element is connected and sealed to the SIM card holder by a flexible glue which allows a 2% contraction.

24. The mechanism according to claim 1, wherein a gasket (3) is provided close to the ends of said access opening and externally with respect to the conductive pads (11), said gasket (3) being suitable to prevent, in cooperation with the external cover (1a), the passage of any undesired substance through the access opening.

25. The mechanism according to claim 1, wherein the shape memory alloy actuating element is in the form of a shape memory alloy wire (10); and the shape memory alloy actuating element extends between the two legs (1b) of the holder frame (1) orthogonally thereto.

* * * * *